United States Patent
Yuyama

(10) Patent No.: US 9,641,010 B2
(45) Date of Patent: May 2, 2017

(54) CHARGER AND ELECTRONIC APPARATUS STABLY SUPPLYING OPERATING VOLTAGE

(71) Applicant: CASIO COMPUTER CO., LTD., Shibuya-ku, Tokyo (JP)

(72) Inventor: Masami Yuyama, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/062,014

(22) Filed: Mar. 4, 2016

(65) Prior Publication Data

US 2016/0352121 A1    Dec. 1, 2016

(30) Foreign Application Priority Data

May 29, 2015   (JP) ................................. 2015-109293

(51) Int. Cl.
G06K 19/06   (2006.01)
H02J 7/00    (2006.01)
G06K 19/07   (2006.01)

(52) U.S. Cl.
CPC ........ *H02J 7/0052* (2013.01); *G06K 19/0723* (2013.01)

(58) Field of Classification Search
USPC .................................. 235/492, 451; 363/124
See application file for complete search history.

(56) References Cited

U.S. PATENT DOCUMENTS

| | | | | |
|---|---|---|---|---|
| 6,392,384 B1* | 5/2002 | Hwang Bo | ........... | H02J 7/0027 320/116 |
| 6,421,263 B1* | 7/2002 | Shinkawa | ............... | G04G 19/02 363/132 |
| 8,853,995 B2 | 10/2014 | Von Novak et al. | | |
| 9,130,047 B2* | 9/2015 | Sakakura | ........... | H01L 29/7869 |
| 2013/0293163 A1* | 11/2013 | Flett | ........................ | H02P 27/08 318/139 |
| 2013/0307462 A1* | 11/2013 | Ohashi | .................... | H02P 27/06 318/762 |

FOREIGN PATENT DOCUMENTS

JP          2012530482 A       11/2012

* cited by examiner

*Primary Examiner* — Ahshik Kim
(74) *Attorney, Agent, or Firm* — Holtz, Holtz & Volek PC

(57) ABSTRACT

A charger includes a power obtaining unit and a power transfer unit. The power obtaining unit charges a first power storage device with a voltage supplied from outside. The power transfer unit transfers power stored in the first power storage device to a second power storage device so as to store the power in the second power storage device. The power transfer unit includes a voltage decrease reduction unit. The voltage decrease reduction unit reduces voltage decrease of the first power storage device per transfer of the power from the first power storage device to the second power storage device. The second power storage device has a capacitance larger than the first power storage device.

18 Claims, 4 Drawing Sheets

US 9,641,010 B2

CHARGER AND ELECTRONIC APPARATUS STABLY SUPPLYING OPERATING VOLTAGE

CROSS-REFERENCE TO RELATED APPLICATIONS

This application is based upon and claims the benefit of priority under 35 USC 119 of Japanese Patent Application No. 2015-109293 filed on May 29, 2015, the entire disclosure of which, including the description, claims, drawings and abstract, is incorporated herein by reference in its entirety.

BACKGROUND OF THE INVENTION

1. Field of the Invention

The present invention relates to a charger and an electronic apparatus stably supplying an operating voltage.

2. Description of the Related Art

There has been an electronic apparatus usable for a long period of time while repeating charge and discharge which is caused by operation, by using a power storage device such as a secondary cell. This kind of power storage device is (i) supplied with power (electric power) by a dedicated charger, or (ii) (a) provided with a power generation means such as solar power, wind power or power generated by making use of vibration of a portable electronic apparatus and (b) charged with surplus power of the generated power. There also has been an electronic apparatus provided with a plurality of accumulators for stable power supply.

In this kind of electronic apparatus, conventionally, one power storage device is chargeable with wireless power supplied from outside. Further, there is a technology of transferring energy from this one power storage device to another power storage device and controlling capacitances of their accumulators so as to supply power to a load from at least one of the power storage devices (Japanese Translation of PCT International Application Publication No. 2012-530482).

SUMMARY OF THE INVENTION

According to an aspect of the present invention, there is provided a charger including: a power obtaining unit which charges a first power storage device with a voltage supplied from outside; and a power transfer unit which transfers power stored in the first power storage device to a second power storage device having a capacitance larger than the first power storage device so as to store the power in the second power storage device, wherein the power transfer unit includes a voltage decrease reduction unit which reduces voltage decrease of the first power storage device per transfer of the power from the first power storage device to the second power storage device.

BRIEF DESCRIPTION OF THE DRAWING

The present invention is fully understood from the detailed description given hereinafter and the accompanying drawings, which are given by way of illustration only and thus are not intended to limit the present invention, wherein.

DETAILED DESCRIPTION OF THE PREFERRED EMBODIMENTS

Hereinafter, embodiments of the present invention are described with reference to the drawings.

First Embodiment

First, an electronic apparatus including a charger according to a first embodiment of the present invention is described.

Figure 1:
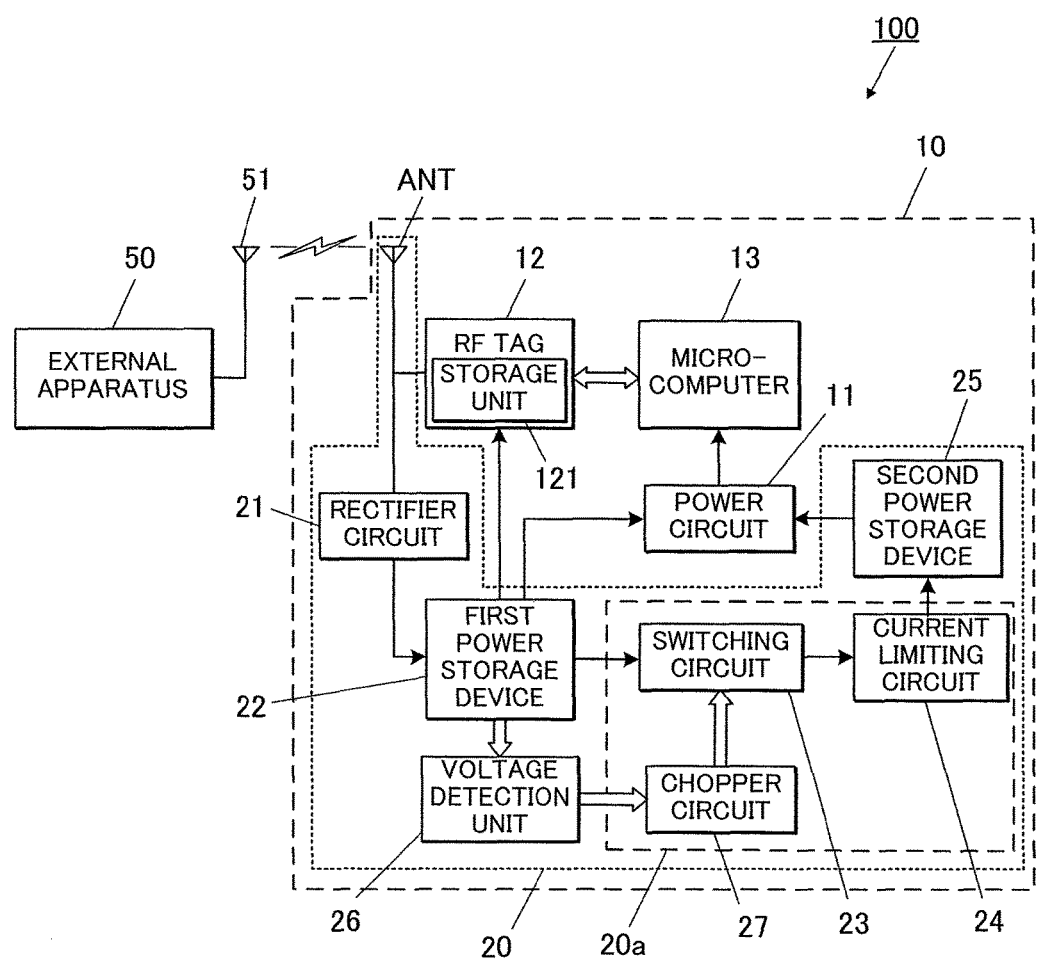
FIG. 1 is a block diagram showing the overall configuration of a communication system including an electronic apparatus including a charger.

FIG. 1 is a block diagram showing the overall configuration of a communication system including an electronic apparatus including a charger according to the embodiment.

A communication system 100 includes: an electronic apparatus 10 including an RF tag 12; and an external apparatus 50 which functions as an RF tag 12 reader/writer. The electronic apparatus 10 and the external apparatus 50 perform wireless communication of Near-Field Radio Communication (NFC) therebetween. The electronic apparatus 10 and the external apparatus 50 include their respective power circuits and operate with power supplied from the respective power circuits.

The external apparatus 50 transmits radio waves for polling with an antenna 51 at predetermined time intervals in a normal state. When detects and receives the wireless radio waves output from the external apparatus 50, the electronic apparatus 10 starts operating with power obtained from variation of electromagnetic field relative to the wireless radio waves and transmits/receives communication data through NFC, and also performs various types of processing accompanying the transmission/reception of the communication data on the basis of power supply from the power circuit. When detects that the electronic apparatus 10 receives the radio waves, the external apparatus 50 communicates with the electronic apparatus 10 at shorter time intervals or continuously as needed.

The electronic apparatus 10 includes a charging circuit 20 as a charger, a power circuit 11, the RF tag 12 and a microcomputer 13 (operating unit).

The charging circuit 20 receives, with an antenna ANT, radio waves of wireless communication from the external apparatus 50 and stores the power, and operates the RF tag 12 and the microcomputer 13 with the stored power.

The charging circuit 20 includes the antenna ANT, a rectifier circuit 21, a first power storage device 22, a switching circuit 23 (switching unit), a current limiting circuit 24 (voltage decrease reduction unit), a second power storage device 25, a voltage detection unit 26 (transfer allowing/prohibiting unit, comparison unit) and a chopper circuit 27 (oscillator circuit).

The rectifier circuit 21 rectifies and smooths the received radio waves and supplies them to the first power storage device 22 and the RF tag 12 as power at the voltage value.

The antenna ANT and the rectifier circuit 21 constitute a power obtaining unit.

The first power storage device 22 stores the power obtained from the rectifier circuit 21, and supplies the power to the RF tag 12 as needed. The power stored in the first power storage device 22 is transferred to the second power storage device 25 when the below-described condition is satisfied. The power storage amount (electrical capacitance of a capacitor as described below, simply referred to as "capacitance") of the first power storage device 22 is smaller than that of the second power storage device 25 and set to be an amount to rapidly reach the operating voltage of the RF tag 12 with the received power of the received amplitude strength of the radio waves transmitted through wireless communication from the external apparatus 50, which is an expected wireless-radio-wave transmitter.

The switching circuit 23 is provided at a point on a path through which power is transferred from the first power storage device 22 to the second power storage device 25, and switches connection of the path ON and OFF. This switching circuit 23 includes a switching element which switches the connection between a capacitor 22C (shown in FIG. 2) of the first power storage device 22 and a capacitor 25C (shown in FIG. 2) of the second power storage device 25 ON and OFF. When the switching element is in the ON state, power is transferred from the first power storage device 22 to the second power storage device 25, whereas when the switching element is in the OFF state, this power transfer is not performed. Meanwhile, the power stored in the second power storage device 25 can be output to the power circuit 11 as needed.

The current limiting circuit 24 limits current (transfer current) flowing from the first power storage device 22 to the second power storage device 25 while the switching element of the switching circuit 23 is in the ON state. That is, the current limiting circuit 24 prevents the power (electric charge) stored in the first power storage device 22 having a small capacitance from sharply decreasing and fluctuation (ripple) of the supply voltage (output voltage) of the first power storage device 22 from being large.

The second power storage device 25 stores the power transferred from the first power storage device 22 and supplies the power at a predetermined voltage to the microcomputer 13 via the power circuit 11. The second power storage device 25 has a capacitance sufficiently larger than the first power storage device 22. The one having a large capacitance is exemplified by an electric double-layer capacitor and a secondary cell. The second power storage device 25 is configured to supply power at a predetermined supply voltage being equal to or higher than the operating voltage of the microcomputer 13 for a preset operating time of the microcomputer 13 or longer.

The voltage detection unit 26 detects the output voltage of the first power storage device 22 and determines whether or not to transfer power to the second power storage device 25. The voltage detection unit 26 detects a relationship (higher/lower relationship) between the output voltage of the first power storage device 22 and a high reference voltage VH and a relationship (higher/lower relationship) between the output voltage of the first power storage device 22 and a low reference voltage VL being lower than the high reference voltage VH, and outputs an operation signal to the chopper circuit 27 according to the detection (comparison) results. From when the output voltage of the first power storage device 22 becomes the high reference voltage VH or higher until the output voltage of the first power storage device 22 becomes lower than the low reference voltage VL, the voltage detection unit 26 outputs, to the chopper circuit 27, the operation signal to allow power transfer from the first power storage device 22 to the second power storage device 25 so as to make the switching element of the switching circuit 23 switch ON and OFF at short time intervals according to the operation of the chopper circuit 27 and thereby repeat the power transfer (i.e. intermittently perform the power transfer). Outside this period of time, namely, (i) until the output voltage of the first power storage device 22 first becomes the high reference voltage VH or higher, and (ii) from when the output voltage of the first power storage device 22 becomes lower than the low reference voltage VL during the power transfer until the output voltage of the first power storage device 22 becomes the high reference voltage VH or higher, the voltage detection unit 26 outputs, to the chopper circuit 27, the operation signal to prohibit the power transfer so as to make the switching element of the switching circuit 23 keep the OFF state.

The chopper circuit 27 performs chopping operation throughout an operation period corresponding to a period of the operation signal (to allow the power transfer) input from the voltage detection unit 26, and this chopping operation makes the switching element of the switching circuit 23 perform the ON/OFF switching operation. Further, the chopper circuit 27 outputs a signal to keep the OFF state to the switching element of the switching circuit 23 throughout an operation prohibition period corresponding to a period of the operation signal (to prohibit the power transfer) input from the voltage detection unit 26.

The switching circuit 23, the current limiting circuit 24 and the chopper circuit 27 constitute a power transfer unit 20a.

The power circuit 11 receives the power stored in the second power storage device 25 via a backflow diode 23D (shown in FIG. 2), and outputs the power after converting the power into a predetermined supply voltage at which the microcomputer 13 can operate. This supply voltage can be set higher than the output voltage of the second power storage device 25. In this case, the power circuit 11 boosts the output voltage of the second power storage device 25 with a booster circuit and outputs the boosted voltage.

The RF tag 12 is an IC chip which operates with, as power, radio waves received and supplied from the external apparatus 50 via the antenna ANT and the rectifier circuit 21. The RF tag 12 includes a storage unit 121 where unique identification information and predetermined status information are stored, and when receives a voltage being a predetermined operating voltage or higher input from the rectifier circuit 21, outputs a predetermined response signal to the external apparatus 50. This response signal or transmission data to be output after the response signal is transmitted contains the unique identification information and the status information stored in the storage unit 121. When new status information is received and obtained from the external apparatus 50, the status information stored in the storage unit 121 is overwritten and updated with the obtained new status information. The information stored in the RF tag 12 may be updated by operation of the microcomputer 13 as needed. The RF tag 12 and the microcomputer 13 can transmit/receive signals to/from each other via a not-shown bus.

The microcomputer 13 performs predetermined operation with the power, which is supplied from the power circuit 11 on the basis of the output voltage of the second power storage device 25. The operation contents of the microcomputer 13 are appropriately determined in advance and may include operation to perform measurement with a not-shown sensor (temperature sensor or the like) at predetermined time intervals and store the measured values in the storage unit 121 of the RF tag 12 as history information.

Figure 2:
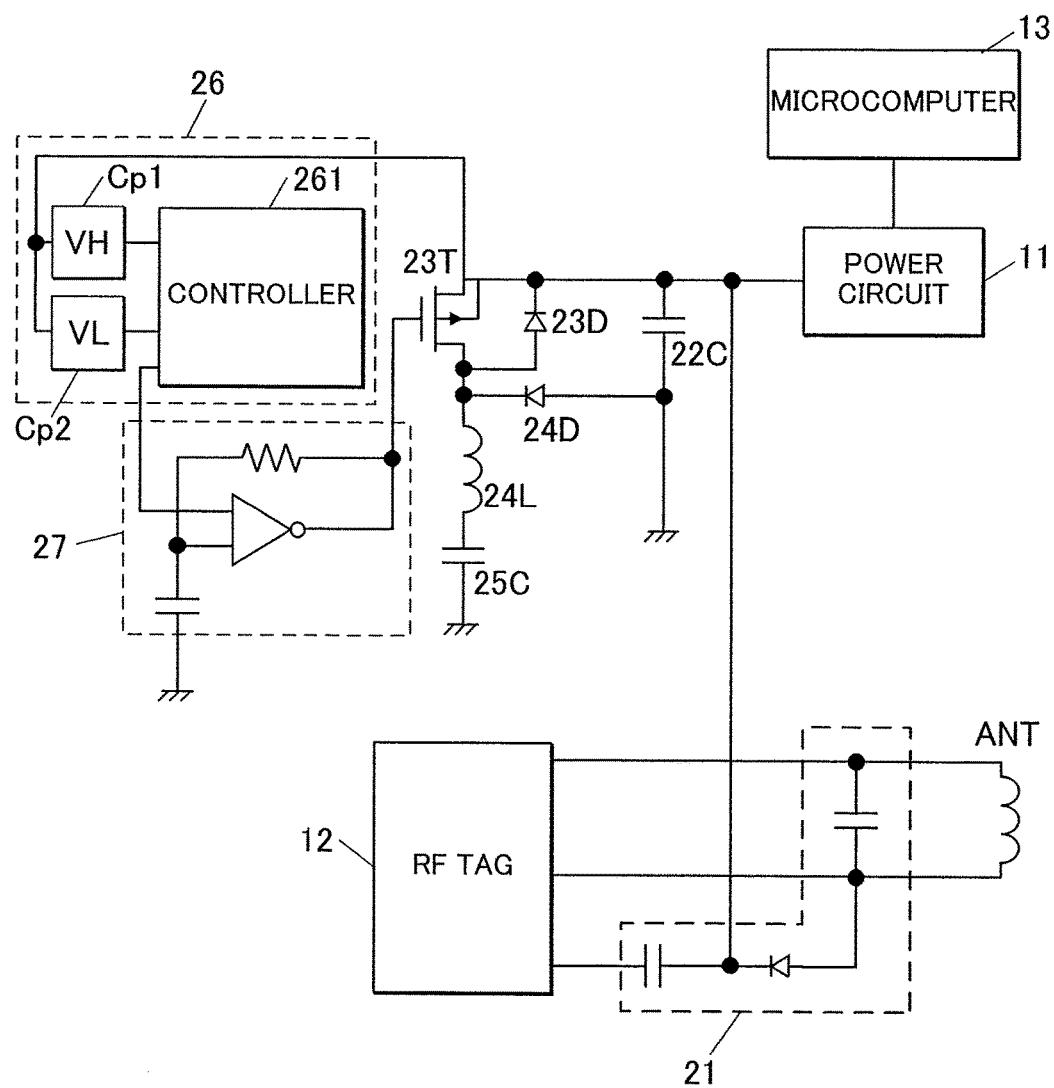
FIG. 2 is a diagram to explain a circuit configuration of the electronic apparatus for charge and discharge according to a first embodiment of the present invention.

FIG. 2 shows a circuit configuration of the electronic apparatus 10 according to the embodiment.

An AC voltage signal received via the antenna ANT is input to the RF tag 12 as it is, and also input as a supply voltage to the RF tag 12 after being rectified by the rectifier circuit 21. As the rectifier circuit 21, any well-known circuit can be used, but in FIG. 2, a circuit using one diode is shown as a simple example.

The supply voltage obtained by the rectification is also input to one end of the capacitor 22C, which constitutes the first power storage device 22. The other end of the capacitor 22C is grounded, and electric charge corresponding to the supply voltage is stored in the first power storage device 22.

This supply voltage, namely, the voltage at the one end of the capacitor 22C (output voltage of the capacitor 22C), is also input to the power circuit 11, the voltage detection unit 26 and the switching circuit 23.

The voltage detection unit 26 includes two voltage detectors Cp1 and Cp2 and a controller 261. The voltage detector Cp1 compares the high reference voltage VH with the supply voltage and outputs the comparison result to the controller 261. The voltage detector Cp2 compares the low reference voltage VL with the supply voltage and outputs the comparison result to the controller 261. From when the supply voltage becomes lower than the low reference voltage VL until the supply voltage becomes the high reference voltage VH (upper limit voltage) or higher, the controller 261 outputs a low level signal to prohibit the chopping operation to the chopper circuit 27, and from when the supply voltage becomes the high reference voltage VH or higher until the supply voltage becomes lower than the low reference voltage VL, the controller 261 outputs a high level signal to allow the chopping operation to the chopper circuit 27. That is, the voltage detection unit 26 allows the transfer from the first power storage device 22 to the second power storage device 25 while keeping the charged voltage of the first power storage device 22 from falling below the low reference voltage VL (reference voltage). The controller 261 is formed of an IC chip having a logic circuit which can output the above-described signals, such as a flip-flop circuit. Setting the low reference voltage VL to the operating voltage of the RF tag 12 or higher can prevent the once-started RF tag 12 from going down.

The voltage detectors Cp1 and Cp2 output the ground voltage when detect that voltage lower than their respective reference voltages is input, and output voltage as it is when detect that voltage equal to or higher than their respective reference voltages is input.

The chopper circuit 27 compares (i) the output signal from the controller 261 according to the comparison results of the voltage detectors Cp1 and Cp2 with (ii) a signal ("comparison signal" below) obtained by subjecting the output signal of the chopper circuit 27 to a low-pass filter composed of a resistor and a capacitor connected in series, and outputs the comparison result to a transistor (FET 23T), which is the switching element of the switching circuit 23. The output signal of the chopper circuit 27 has two values, a high level and a low level. The low level output signal has a lower voltage than the low level signal output from the controller 261, and the high level output signal has a higher voltage than the high level signal output from the controller 261. Thereby, during input of the high level signal from the controller 261, (i) when time corresponding to time constant determined by the resistance value of the resistor and the capacitance of the capacitor elapses after output of the comparator changes from the low level to the high level, the comparison signal becomes the voltage of the high level signal output from the controller 261 or higher and the output of the comparator changes to the low level, and (ii) when time corresponding to the time constant elapses after output of the comparator changes from the high level to the low level, the comparison signal becomes lower than the voltage of the high level signal output from the controller 261 and the output of the comparator changes to the high level. That is, the chopper circuit 27 constitutes an oscillator circuit, and the FET 23T of the switching circuit 23 repeatedly switches ON and OFF according to the oscillation operation of the oscillator circuit.

The switching circuit 23 includes the FET 23T and the backflow diode 23D.

The gate terminal of the FET 23T is connected to the output of the chopper circuit 27, the source terminal thereof is connected to the one end of the capacitor 22C of the first power storage device 22, and the drain terminal thereof is connected to the current limiting circuit 24. The FET 23T switches ON and OFF according to the level (high level/low level) of the output signal of the chopper circuit 27. Throughout ON of the FET 23T, the FET 23T transfers the power stored in the capacitor 22C of the first power storage device 22 to the capacitor 25C of the second power storage device 25.

Throughout OFF of the FET 23T, the backflow diode 23D prevents the power from transferring from the first power storage device 22 to the second power storage device 25, but can output the power stored in the second power storage device 25 to the power circuit 11 when the microcomputer 13 operates.

The current limiting circuit 24 includes an inductor 24L and a diode 24D. One end of the inductor 24L is connected to the drain terminal of the FET 23T and the cathode of the diode 24D, and the other end thereof is connected to one end of the capacitor 25C. That is, the inductor 24L is provided at a point on the path where the transfer current flows from the capacitor 22C to the capacitor 25C. The anode of the diode 24D is grounded.

This prevents sharp increase in the current flowing from the capacitor 22C to the capacitor 25C in the ON state of the FET 23T. Further, the period throughout which the FET 23T stays ON according to the output of the chopper circuit 27 is properly set to a predetermined period according to the inductance of the inductor 24L or shorter. This prevents the current from the capacitor 22C to the capacitor 25C from being large current. Meanwhile, the induced current which is generated in the inductor 24L flows through the diode 24D immediately after the FET 23T becomes OFF. This compensates charging of the capacitor 25C.

The second power storage device 25 includes the capacitor 25C. One end of the capacitor 25C is connected to the inductor 24L, and the other end thereof is grounded. The capacitor 25C has a sufficiently larger capacitance than the capacitor 22C, and, as described above, as the capacitor 25C, an electric double-layer capacitor is used, for example.

Figure 3:
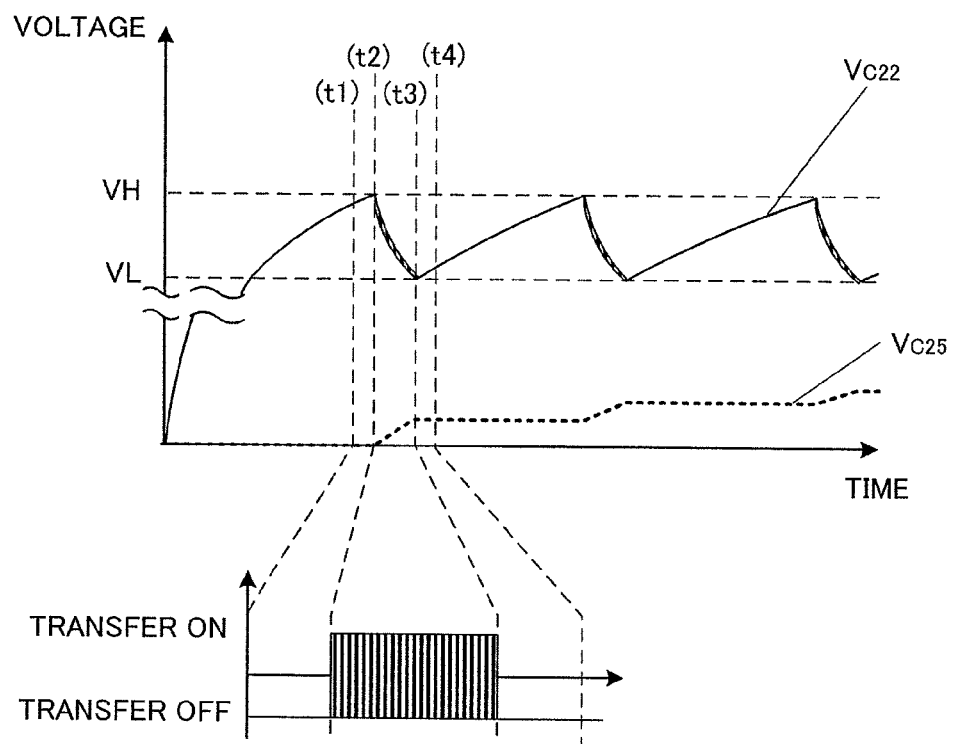
FIG. 3 shows an example of change of the state of power storage into a first power storage device and a second power storage device of a charging circuit over time.

FIG. 3 shows an example of change of the state of power storage into the first power storage device 22 and the second power storage device 25 of the charging circuit 20 over time according to the embodiment.

First, in the state in which the voltage $V_{C22}$ of the capacitor 22C of the first power storage device 22 is lower than the low reference voltage VL, the chopper circuit 27 stops operating in response to the operation signal output from the controller 261, whereby the switching circuit 23 becomes and keeps the OFF state (a transfer allowing/prohibiting step). Thereafter, even when the voltage $V_{C22}$ of the capacitor 22C becomes the low reference voltage VL or higher, the switching circuit 23 keeps the OFF state and the capacitor 22C is charged (timings (t1) to (t2), a power obtaining step) until the voltage $V_{C22}$ becomes the high reference voltage VH or higher. Because the capacitance of the capacitor 22C is small, the voltage $V_{C22}$ of the capacitor 22C rapidly increases.

When the voltage $V_{C22}$ of the capacitor 22C becomes the low reference voltage VL or higher and further becomes the high reference voltage VH or higher, the chopper circuit 27 becomes capable of operating in response to the operation signal output from the controller 261 (the transfer allowing/prohibiting step) and starts oscillation operation, whereby the switching circuit 23 repeatedly performs the ON/OF switching operation at short time intervals (timings (t2) to (t3)). FIG. 3 schematically shows the state in which Transfer ON and Transfer OFF are alternated. Thereby, power is intermittently transferred from the first power storage device 22 to the second power storage device 25 (a power transfer step). During the time, thanks to the operation of the current limiting circuit 24, the current flowing between the capacitor 22C of the first power storage device 22 and the capacitor 25C of the second power storage device 25 does not accompany loss by heat generation, which is caused by a resistor(s) or the like, and therefore does not become short-circuit current. Further, this slows speed of voltage decrease of the capacitor 22C caused by individual transfer currents during the chopping operation, and reduces voltage decrease per transfer time (per transfer current) during the chopping operation. (In FIG. 3, the width (in the vertical direction) of the hatched part representing a falling period in a line showing change of the voltage $V_{C22}$ is small.)

This power transfer by the chopping operation decreases the voltage $V_{C22}$ of the capacitor 22C by degrees and increases the voltage $V_{C25}$ of the capacitor 25C. Because the capacitance of the capacitor 25C is much larger than that of the capacitor 22C, voltage increase of the capacitor 25C is more gradual than voltage decrease of the capacitor 22C.

When the voltage $V_{C22}$ of the capacitor 22C falls below the low reference voltage VL, the operation signal from the controller 261 changes, whereby the chopper circuit 27 stops operating (timings (t3) to (t4)). Thereby, the switching circuit 23 keeps the transfer current in the OFF state, and only the capacitor 22C is charged until the voltage $V_{C22}$ of the capacitor 22C becomes the high reference voltage VH or higher again.

As described above, the charging circuit 20 provided in the electronic apparatus 10 of the embodiment includes: the antenna ANT and the rectifier circuit 21 as the power obtaining unit which charges the first power storage device 22 (capacitor 22C) with a voltage supplied from the external apparatus 50; and the power transfer unit 20a which transfers power stored in the first power storage device 22 to the second power storage device 25 having a capacitance larger than the first power storage device 22 so as to store the power in the second power storage device 25. The power transfer unit 20a includes the current limiting circuit 24 which reduces voltage decrease of the first power storage device 22 per transfer of the power from the first power storage device 22 to the second power storage device 25.

This can rapidly increase the output voltage of the first power storage device 22 to the operating voltage of the RF tag 12, and also can properly transfer the power stored in the first power storage device 22 to the second power storage device 25 while preventing the ripple of the output voltage from being large.

The power transfer unit 20a performs chopping operation to perform the transfer intermittently. This can reduce the power transfer amount per transfer of the power, thereby reducing voltage decrease of the first power storage device 22, while minutely and rapidly charging the second power storage device 25.

The current limiting circuit 24 includes the inductor 24L provided at a point on the path of the transfer current flowing between the first power storage device 22 and the second power storage device 25. During the chopping operation, the inductor 24L (i) reduces the transfer current while the transfer is being performed, thereby reducing voltage decrease of the first power storage device 22 (capacitor 22C), and (ii) generates current and stores power in the second power storage device 25 (capacitor 25C) after the transfer is suspended. This can prevent the transfer current from short-circuiting and hence can more easily and certainly reduce voltage decrease of the first power storage device 22, and also can let the current flow in the inductor 24L after the transfer is suspended and hence can compensate the reduced/suspended power supply with the current and accordingly more efficiently charge the electronic apparatus 10.

The power transfer unit 20a includes: the chopper circuit 27, which constitutes the oscillator circuit; and the switching circuit 23 repeatedly switches connection between the first power storage device 22 and the second power storage device 25 on and off according to the oscillation operation of the oscillator circuit, with the FET 23T provided at a point on the path of the transfer current between the first power storage device 22 and the second power storage device 25.

Thereby, the chopping operation can be easily and stably performed, and also the power transfer can be performed within a proper range and hence the ripple accompanying the voltage decrease of the first power storage device 22 can be prevented from being large.

The charging circuit 20 includes the voltage detection unit 26 as the transfer allowing/prohibiting unit which (i) does not allow the transfer while the output voltage of the first power storage device 22 is lower than the predetermined low reference voltage VL, and (ii) allows the power transfer unit 20a to transfer power from the first power storage device 22 to the second power storage device 25, namely, allows the transfer, from when the output voltage of the first power storage device 22 becomes the predetermined high reference voltage VH or higher, the high reference voltage VH being higher than the low reference voltage VL, until the output voltage of the first power storage device 22 becomes lower than the low reference voltage VL. This can keep the output voltage of the first power storage device 22 at a proper level which is the operating voltage of the RF tag 12 or higher while easily and efficiently transferring the power to the second power storage device 25.

The voltage detection unit 26 includes: the voltage detectors Cp1 and Cp2 as the comparison unit which compares the output voltage of the first power storage device 22 with each of the low reference voltage VL and the high reference voltage VH; and the controller 261 determines whether or not to allow the power transfer unit 20a to perform the transfer on the basis of the comparison result of the comparison unit. Thereby, whether or not to allow the power transfer can be easily and properly determined on the basis of the two end voltages (the low reference voltage VL and the high reference voltage VH) and the higher/lower relationship between the output voltage of the first power storage device 22 and each of the reference voltages only, without caring any voltage between the two end voltages.

The voltage detection unit 26 stops the oscillation operation of the chopper circuit 27 while not allowing the power transfer unit 20a to perform the transfer, and the switching circuit 23 keeps, with the FET 23T, the connection of the path, through which the power is transferred, between the first power storage device 22 and the second power storage device 25 off while the oscillation operation of the chopper circuit 27 stops. This makes it easy to control the switching operation of the FET 23T.

The power obtaining unit includes: the antenna ANT which receives wireless radio waves transmitted from the external apparatus 50; and the rectifier circuit 21 which rectifies current of the received wireless radio waves. This makes it possible to use the same antenna for both receiving wireless radio waves, which is ordinary operation, and obtaining power and hence can reduce circuit size and simplify a circuit due to the received radio waves used for obtaining power.

The antenna ANT receives the wireless radio waves transmitted through Near-Field Radio Communication (NFC) from the external apparatus 50 which is involved in at least one of reading and writing of the RF tag 12. Hence, the present invention can be effectively applied, in particular, to an electronic apparatus including a device which can operate without preparing power by itself, such as the RF tag 12.

The capacitor 25C of the second power storage device 25 is one of a secondary cell and an electric double-layer capacitor, and hence can stably store a large amount of electricity (power).

The first power storage device 22 is the capacitor 22C, and hence can easily store a small amount of electricity (power) with a small size.

The electronic apparatus 10 of the embodiment includes, in addition to the charging circuit 20, the RF tag 12 which operates with, as power, wireless radio waves transmitted from the external apparatus 50 through Near-Field Radio Communication; and the microcomputer 13 which performs predetermined operation with the power stored in the second power storage device 25. Hence, when the RF tag 12 is operated, and the microcomputer 13 is operated relative or irrelative to the operation of the RF tag 12, the second power storage device 25 is charged according to the operation of the RF tag 12, so that the microcomputer 13 can operate. This can save time and effort to prepare a battery for the microcomputer 13 or to separately charge the microcomputer 13. Further, when the RF tag 12 performs active transmission or the like in particular, the second power storage device 25 can be effectively charged according to the operation of the RF tag 12. This enables efficient and comfortable wireless communication with the RF tag 12.

The low reference voltage VL is determined to be higher than the operating voltage of the RF tag 12. This enables continuous supply of the operating voltage of the RF tag 12 to the RF tag 12 and hence can stably operate the RF tag 12 while storing the power into the second power storage device 25. In particular, in the case where the frequency of communication received for polling in the waiting state in which the RF tag 12 does not operate is lower than the frequency of communication in the ordinary continuous operation state in which the RF tag 12 is in operation, obtainable power per unit time in the waiting state is low, and hence efficient charging cannot be performed. Then, keeping continuous supply of the operating voltage enables more rapid charging.

Second Embodiment

Next, the electronic apparatus 10 including a charger according to a second embodiment of the present invention is described.

Figure 4:
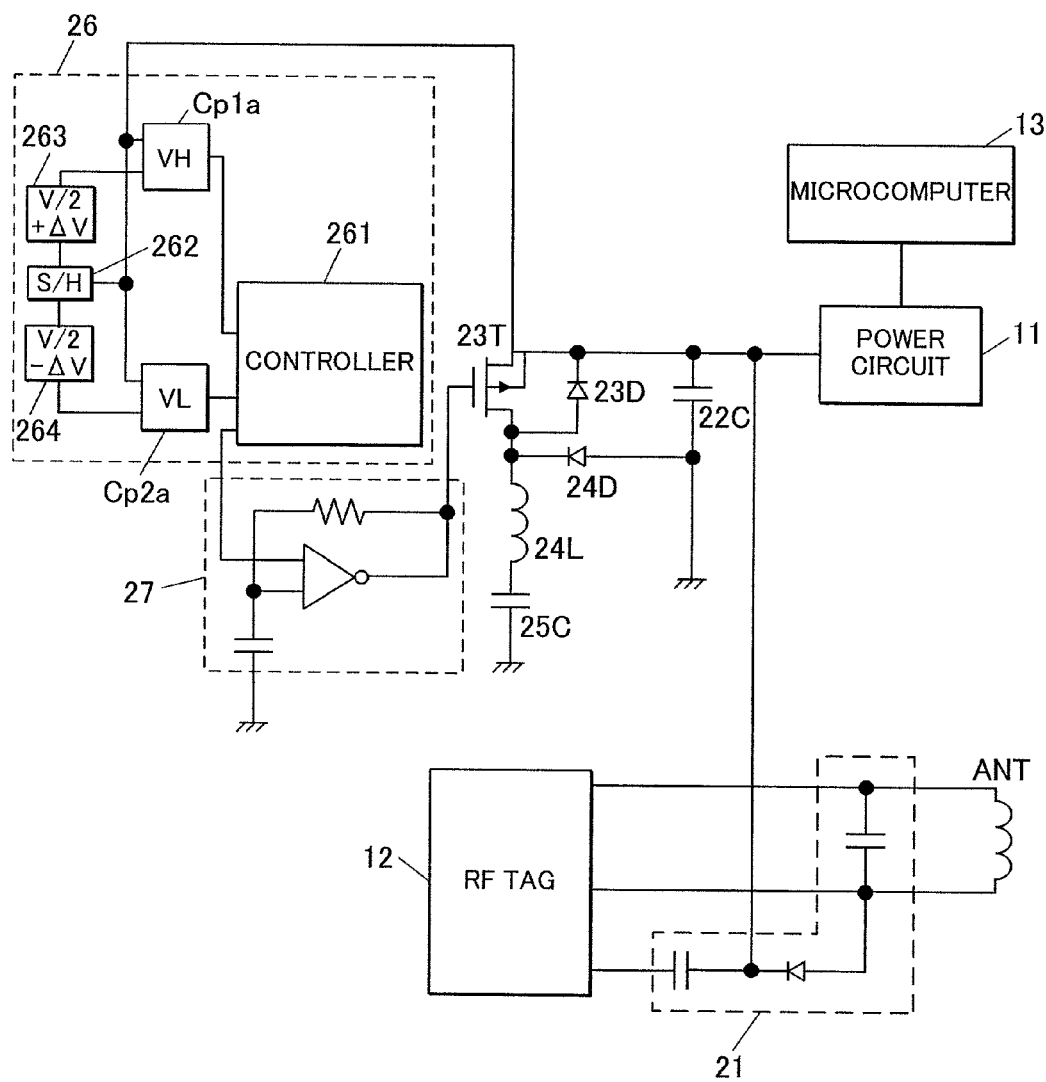
FIG. 4 is a diagram to explain a circuit configuration of the electronic apparatus for charge and discharge according to a second embodiment of the present invention.

FIG. 4 shows an example of a circuit configuration of the electronic apparatus 10 for charge and discharge according to the second embodiment, wherein the high reference voltage VH and the low reference voltage VL are variable.

The voltage obtained by rectifying, with the rectifier circuit 21, the radio waves received by the antennal ANT is supplied to the capacitor 22C of the first power storage device 22 and also sampled by a sample and hold circuit 262 at appropriate timing, whereby a voltage value V is held. This held voltage value V is transformed at an upper side transformer 263 by adding a difference value $\Delta V$ (a predetermined value proper to determine the difference between the high reference voltage VH and the low reference voltage VL) to a half value V/2 of the voltage value V and then input to a voltage detector Cp1$a$ as the high reference voltage VH or as a value to set the high reference voltage VH, and also transformed at a lower side transformer 264 by subtracting the difference value $\Delta V$ from the half value V/2 and then input to a voltage detector Cp2$a$ as the low reference voltage VL or as a value to set the low reference voltage VL.

Charging efficiency of the second power storage device 25 is increased by thus determining the high reference voltage VH and the low reference voltage VL, which are compared with the supply voltage (output voltage) of the first power storage device 22, such that input of about half of the open circuit voltage of the antenna ANT operates the controller 261 to charge the capacitor 25C of the second power storage device 25.

As described above, in the charging circuit 20 of the electronic apparatus 10 of the second embodiment of the present invention, the low reference voltage VL can be determined according to the amplitude of the input voltage via the antenna ANT, namely, according to the output voltage of the first power storage device 22, thereby being variable.

In addition to the low reference voltage VL, the upper reference voltage VH can also be determined according to the output voltage of the first power storage device 22, thereby being variable.

This enables the power transfer unit 20$a$ to transfer the power within a voltage range proper in terms of, for example, power transfer efficiency.

The present invention is not limited to the above embodiments and can be modified in a variety of aspects.

For example, in the above embodiments, charging is performed by receiving NFC radio waves as wireless radio waves. However, the wireless communication is not limited to NFC. The forms relative to signal transmission, such as the frequency, modulation system and signal transmission format, are appropriately determined. Charging may be performed, other than through wireless communication, by obtaining electromagnetic waves transmitted not for communication, variation of electromagnetic field in space generated by electromagnetic induction with the inductor component of an electrical circuit, or AC voltage supplied through a cable.

Further, in the above embodiments, the first power storage device 22 includes the ordinary capacitor 22C, and the second power storage device 25 includes the capacitor 25C of an electric double-layer capacitor or the like. These are not limitations. For example, as the second power storage device 25, a secondary cell may be used. Further, the component in the first power storage device 22 and/or the second power storage device 25 is not limited to a single component, and thus may be two or more components connected in parallel.

Further, in the above embodiments, in terms of reduction in power loss and charging efficiency in OFF of the FET 23T, the inductor 24L is used for slowing the speed of voltage decrease. Additionally or alternatively, a resistor having a low resistance may be used. Further additionally or alternatively, a third power storage device having a small or medium capacitance may be provided between the first power storage device 22 and the second power storage device 25 so as not to drastically reduce potential difference between the first power storage device 22 and the second power storage device 25.

Further, in the above embodiments, the chopping operation is performed at a fixed frequency corresponding to that of the oscillation operation of the chopper circuit 27. However, the chopper circuit 27 may be configured to make the fixed frequency variable, or a component to change the duty cycle according to, for example, potential difference between the first power storage device 22 and the second power storage device 25 may be provided.

Further, in the above embodiments, from when the output voltage of the capacitor 22C becomes the high reference voltage VH or higher until the output voltage thereof becomes lower than the low reference voltage VL, the chopping operation is performed to transfer power. However, this is not at all intended to prevent the transfer operation from when the output voltage of the capacitor 22C becomes the low reference voltage VL or higher until the output voltage thereof becomes the high reference voltage VH or higher. Depending on the situation, the power transfer may be performed during this period at a duty cycle lower than that of the power transfer in the above embodiments.

Further, in the above embodiments, two voltage detectors, Cp1 and Cp2 or the like, are used to detect the higher/lower relationship between the output voltage of the first power storage device 22 and each of the high reference voltage VH and the low reference voltage VL, and the controller 261 is used to determine whether or not to operate the chopper circuit 27. Detection of the relationship between the output voltage of the first power storage device 22 and each of these reference voltages, determination of whether or not to operate the chopper circuit 27 and the like may be performed by other component (s).

Further, in the above embodiments, the electronic apparatus 10 includes the RF tag 12 which operates with wireless radio waves. However, it is possible that the electronic apparatus 10 does not include the RF tag 12, and wireless radio waves are simply used as a trigger for starting the microcomputer 13. In this case, the low reference voltage VL may be determined according to not the operating voltage of the RF tag 12 but detection accuracy of the start trigger or the like. The electronic apparatus 10 may include, instead of the RF tag 12, another component which performs operation.

In addition to the above, the specific details described in the above embodiments, such as circuit configurations and operation contents, can be appropriately modified within a scope not departing from the spirit of the present invention.

In the above, several embodiments of the present invention are described. However, the scope of the present invention is not limited to the above embodiments but includes the scope of the present invention stated in claims below and the scope of equivalents.

What is claimed is:

1. A charger comprising:
    a power obtaining unit which charges a first power storage device with a voltage supplied from outside; and
    a power transfer unit which transfers power stored in the first power storage device to a second power storage device having a capacitance larger than the first power storage device so as to store the power in the second power storage device,
    wherein the power obtaining unit includes:
        an antenna which receives a wireless radio wave transmitted from an external apparatus; and
        a rectifier circuit which rectifies current of the received wireless radio wave, and
    wherein the power transfer unit includes a voltage decrease reduction unit which reduces voltage decrease of the first power storage device per transfer of the power from the first power storage device to the second power storage device.

2. The charger according to claim 1, wherein the power transfer unit performs a chopping operation to perform the transfer intermittently.

3. The charger according to claim 2, wherein:
    the voltage decrease reduction unit includes an inductor provided at a point on a path of transfer current flowing between the first power storage device and the second power storage device, and
    during the chopping operation, the inductor (i) reduces the transfer current while the transfer is being performed, thereby reducing the voltage decrease of the first power storage device, and (ii) generates current and stores power in the second power storage device after the transfer is suspended.

4. The charger according to claim 1, further comprising a transfer allowing or prohibiting unit which (i) does not allow the transfer while an output voltage of the first power storage device is lower than a reference voltage, and (ii) allows the transfer from when the output voltage of the first power storage device becomes an upper limit voltage or higher, the upper limit voltage being higher than the reference voltage, until the output voltage of the first power storage device becomes lower than the reference voltage.

5. The charger according to claim 4, wherein the transfer allowing or prohibiting unit:
    includes a comparison unit which compares the output voltage of the first power storage device with each of the reference voltage and the upper limit voltage, and
    determines whether or not to allow the transfer based on a comparison result of the comparison unit.

6. The charger according to claim 4, wherein:
    the power transfer unit includes:
        an oscillator circuit; and
        a switching unit which repeatedly switches connection between the first power storage device and the second power storage device on and off according to oscillation operation of the oscillator circuit,
    the transfer allowing or prohibiting unit stops the oscillation operation of the oscillator circuit while not allowing the transfer, and
    the switching unit keeps the connection off while the oscillation operation of the oscillator circuit stops.

7. The charger according to claim 1, wherein the antenna receives the wireless radio wave transmitted through near-field radio communication from the external apparatus which is involved in at least one of reading and writing of an RF tag.

8. The charger according to claim 1, wherein the second power storage device is one of a secondary cell and an electric double-layer capacitor.

9. The charger according to claim 1, wherein the first power storage device is a capacitor.

10. The charger according to claim 4, wherein the reference voltage is determined according to the output voltage, thereby being variable.

11. The charger according to claim 4, wherein the reference voltage and the upper limit voltage are determined according to the output voltage, thereby being variable.

12. A charger comprising:
   a power obtaining unit which charges a first power storage device with a voltage supplied from outside: and
   a power transfer unit which transfers power stored in the first power storage device to a second power storage device having a capacitance larger than the first power storage device so as to store the power in the second power storage device, by performing a chopping operation to perform the transfer intermittently,
   wherein the power transfer unit includes:
      an oscillator circuit;
      a switching unit which repeatedly switches connection between the first power storage device and the second power storage device on and off according to oscillation operation of the oscillator circuit; and
      a voltage decrease reduction unit which reduces voltage decrease of the first power storage device per transfer of the power from the first power storage device to the second power storage device according to the switching unit switching the connection between the first power storage device and the second power storage device on and off.

13. An electronic apparatus comprising:
   the charger according to claim 1;
   an RF tag which operates with, as power, the wireless radio wave, which is transmitted from the outside through near-field radio communication; and
   an operating unit which performs an operation with the power stored in the second power storage device.

14. The electronic apparatus according to claim 13, wherein:
   the charger further comprises a transfer allowing or prohibiting unit which (i) does not allow the transfer while an output voltage of the first power storage device is lower than a reference voltage, and (ii) allows the transfer from when the output voltage of the first power storage device becomes an upper limit voltage or higher, the upper limit voltage being higher than the reference voltage, until the output voltage of the first power storage device becomes lower than the reference voltage, and
   the reference voltage is determined to be higher than an operating voltage of the RF tag.

15. A charging method of a charger which obtains a voltage supplied from an external apparatus the charger comprising an antenna which receives a wireless radio wave transmitted from the external apparatus, and a rectifier circuit which rectifies current of the received wireless radio wave, the method comprising:
   a power obtaining step of charging a first power storage device with a voltage supplied from the external apparatus; and
   a power transfer step of transferring power stored in the first power storage device to a second power storage device having a capacitance larger than the first power storage device so as to store the power in the second power storage device,
   wherein the power obtaining step includes:
      a receiving step of receiving, via the antenna, the wireless radio wave transmitted from the external apparatus; and
      a rectifying step of rectifying, by the rectifier circuit, current of the received wireless radio wave, and
   wherein the power transfer step includes a voltage decrease reduction step of reducing voltage decrease of the first power storage device per transfer of the power from the first power storage device to the second power storage device.

16. The charging method according to claim 15, wherein in the power transfer step, a chopping operation to perform the transfer intermittently is performed.

17. The charging method according to claim 15, further comprising a transfer allowing/prohibiting step of (i) not allowing the transfer while an output voltage of the first power storage device is lower than a reference voltage, and (ii) allowing the transfer from when the output voltage of the first power storage device becomes an upper limit voltage or higher, the upper limit voltage being higher than the reference voltage, until the output voltage of the first power storage device becomes lower than the reference voltage.

18. The charging method according to claim 17, wherein:
   the transfer allowing or prohibiting step includes a comparison step of comparing the output voltage of the first power storage device with each of the reference voltage and the upper limit voltage, and
   in the transfer allowing or prohibiting, whether or not to allow the transfer is determined based on a comparison result of the comparison step.

* * * * *